(12) United States Patent
Bleach

(10) Patent No.: US 9,672,268 B2
(45) Date of Patent: Jun. 6, 2017

(54) METHODS OF QUERYING A RELATIONAL DATABASE

(71) Applicant: Dataline Software, Ltd., Brighton, Sussex (GB)

(72) Inventor: Adrian Bleach, Brighton (GB)

(73) Assignee: DATALINE SOFTWARE, LTD., Brighton, Sussex (GB)

( * ) Notice: Subject to any disclaimer, the term of this patent is extended or adjusted under 35 U.S.C. 154(b) by 336 days.

(21) Appl. No.: 14/395,318

(22) PCT Filed: Apr. 17, 2013

(86) PCT No.: PCT/GB2013/050974
§ 371 (c)(1),
(2) Date: Oct. 17, 2014

(87) PCT Pub. No.: WO2013/156733
PCT Pub. Date: Oct. 24, 2013

(65) Prior Publication Data
US 2015/0066910 A1    Mar. 5, 2015

(30) Foreign Application Priority Data

Apr. 17, 2012 (GB) .................... 1206722.9

(51) Int. Cl.
*G06F 7/00* (2006.01)
*G06F 17/30* (2006.01)

(52) U.S. Cl.
CPC .. *G06F 17/30595* (2013.01); *G06F 17/30424* (2013.01); *G06F 17/30451* (2013.01); *G06F 17/30498* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 2009/0043733 A1* | 2/2009 | Kingsford | G06F 17/30321 |
| 2009/0157641 A1* | 6/2009 | Andersen | H04L 29/12132 |
| 2010/0082671 A1* | 4/2010 | Li | G06F 17/30498 707/770 |
| 2012/0331010 A1* | 12/2012 | Christie | G06F 17/30283 707/802 |

FOREIGN PATENT DOCUMENTS

WO    WO 95/21407    8/1995

* cited by examiner

*Primary Examiner* — Tuan A Pham
(74) *Attorney, Agent, or Firm* — Maldjian Law Group LLC

(57) ABSTRACT

A computer implemented method of obtaining a dataset which answers a main query from a relational database comprises providing a first real result table and one or more further real result tables. The first real result table contains a first dataset obtained from the database which answers a first subquery that forms part of the main query, and the or each further real result table contains a respective further dataset obtained from the database which answers a respective further subquery that forms part of the main query. A dataset is obtained from the first and one or more further real result tables which answers the main query. The computer implemented method obtains a dataset which answers a main query in a reliable and consistent manner.

22 Claims, 6 Drawing Sheets

| Patient ID | Event Date |
|---|---|
| 10282 | 01/02/2009 |
| 11234 | 11/02/2009 |
| 23764 | 16/03/2009 |
| 93452 | 16/03/2009 |
| 15421 | 19/05/2009 |
| 30364 | 21/05/2009 |
| 11286 | 22/06/2009 |
| 21486 | 29/07/2009 |

METHODS OF QUERYING A RELATIONAL DATABASE

CROSS-REFERENCE TO RELATED APPLICATIONS

This application represents a National Stage application of PCT/GB2012/050974 entitled "Methods of Querying a Relational Database"filed Apr. 17, 2013, pending.

BACKGROUND OF THE INVENTION

The present invention relates to computer implemented methods of obtaining a dataset answering a query from a relational database. The invention is particularly, although not exclusively, directed to methods of obtaining such a dataset using a structured query language (SQL).

A relational database is a commonly used form of database in which information is stored and accessed via so-called base "relations", which, in implementations, are in the form of tables having rows and columns. In typical arrangements, the rows of the table represent records, each row being a structured set of related information about a given item, and the columns represent fields or attributes of the rows.

Ever increasing amounts of data are collected, and organised into relational databases. There is correspondingly an increasing need to be able to effectively query the data held in such databases to obtain datasets of interest. When querying a relational database, a database query language is used. One particularly well known example of such a language is the structured query language (SQL), which may also be used in performing other functions in relation to the database, e.g. updating and managing the database.

SUMMARY OF THE INVENTION

The Applicant has recognised that when certain queries are executed in a conventional manner using such languages, e.g. using SQL, there is a significant degree of unpredictability as to the speed with which the query is answered, or indeed, whether an answer is provided at all. This problem has been found to be particularly associated with operations to find the intersection of datasets, e.g. using SQL "INTERSECTION" or "INNER JOIN" commands, and is exacerbated when larger databases are involved and/or when larger numbers of datasets are intersected. For example, a similar query to obtain a logical intersection of two or more datasets in a large relational database using SQL may be answered in a matter of seconds on one occasion, but on another occasion an answer may be provided at best in a matter of hours or even days. The reasons for this erratic behaviour by query languages such as SQL are not clear, although would seem related to the way in which the algorithm scans the tables of the database in order to extract datasets. Such behaviour has been observed, for example, in attempts to retrieve patient records matching two or more criteria from a database holding medical records of a size in the order of around 1 TB.

One way in which a query to obtain the logical intersection of two or more datasets may be carried out using conventional techniques implemented using SQL will now be described by way of background.

This example is by reference to a relational database storing data indicative of patient medical events (the "GPRD" database). Data indicative of a plurality of medical events is stored by associating an event date and event code identifying the nature of each event with a unique code identifying the patient to whom the event relates. The event codes may be medical event codes e.g. identifying a particular condition diagnosed, consultation taking place etc, or may be related to a therapeutic event e.g. a given product being prescribed etc.

An SQL "SELECT" statement can be used to return a two column Result Set from the database: patid, eventdate when executed. The combination of patient ID and event date provides a dataset which is indicative of a patient event.

By way of example, consider the case where it is desired to obtain a dataset which is the list of patient codes and the event dates for patient events having a medical code a) matching any of the medical codes in a codelist (1), or b) a product code matching any of the product codes in a code list (3). This may be done by executing two "SELECT" statements to provide lists of patient codes and associated event dates for patient events meeting criterion a) and b) respectively, and then using an SQL "UNION" operation to combine the lists;

```
SELECT patid, eventdate
FROM  GPRD_MEGA.dbo.[MEDEVENT] me
INNER JOIN dbo.CodeListMember clm ON clm.MemberId_FK =
me.medcode
AND clm.CodeListId_FK IN ( 1 )
UNION ALL
SELECT patid, eventdate
FROM  GPRD_MEGA.dbo.[THERAPY] t
INNER JOIN dbo.CodeListMember clm ON clm.MemberId_FK =
t.prodcode
AND clm.CodeListId_FK IN ( 3 )
```

The above SQL code can be read as follows:
"SELECT" all the patient codes and their respective "event dates" from the GPRD_MEGA database
Where the patient has a medical event where the medical codes match any of the medical codes in codelist (1)
THEN
"SELECT" all the patient codes and their respective "event dates" from the GPRD_MEGA database
Where the patient has a therapy event where the product codes match any of the product codes in codelist (3)
FINALLY
"UNION" the two sets of patient codes together If it is desired to obtain the intersection of one or more datasets obtained using one or more SQL "SELECT" statements as above, then this may be done conventionally by creating a derived table in respect of each dataset, and then obtaining the intersection of the datasets in the derived tables using an SQL "INNER JOIN" operation.

By way of example, to illustrate the creation of a derived table, the following SQL "SELECT" statement:

```
SELECT patid, eventdate
FROM  GPRD_MEGA.dbo.[MEDEVENT] me
INNER JOIN dbo.CodeListMember clm ON clm.MemberId_FK =
me.medcode
AND clm.CodeListId_FK IN ( 1 )
``` may be turned into a derived table by modifying the SQL code as follows:

The syntax is altered by wrapping the "SELECT" statement in brackets and providing a table name. Thus, the above "SELECT" statement becomes:

```
(
SELECT patid, eventdate
FROM   GPRD_MEGA.dbo.[MEDEVENT] me
INNER JOIN dbo.CodeListMember clm ON clm.MemberId_FK =
me.medcode
``` obtained by performing an "INNER JOIN" operation on the three datasets. The "SELECT DISTINCT" statement ensures that only distinct results are included in the final dataset. The SQL code below is annotated with comments in italics identifying the portions of code giving rise to derived tables;

```
/************************************************************/
SELECT DISTINCT
       p.*
FROM   GPRD_MEGA.dbo.patient p
       INNER JOIN (
                  -- FIRST derived table
                  SELECT patid, eventdate
           FROM   GPRD_MEGA.dbo.[MEDEVENT] me
                  INNER JOIN dbo.CodeListMember clm ON clm.MemberId_FK =
me.medcode
                         AND clm.CodeListId_FK IN ( 1 )
                  ) DerivedTablename1 ON p.patid = DerivedTablename1.patid
       INNER JOIN (
                  -- SECOND derived table,
                  SELECT patid, eventdate
           FROM   GPRD_MEGA.dbo.[MEDEVENT] me
                  INNER JOIN dbo.CodeListMember clm ON clm.MemberId_FK =
me.medcode
                         AND clm.CodeListId_FK IN ( 2 )
                  ) DerivedTablename2 ON p.patid = DerivedTablename2.patid
       INNER JOIN (
                  -- Third Derived table
                  SELECT patid, eventdate
           FROM   GPRD_MEGA.dbo.[THERAPY] t
                  INNER JOIN dbo.CodeListMember clm ON clm.MemberId_FK =
t.prodcode
                         AND clm.CodeListId_FK IN ( 3 )
                  ) DerivedTablename3 ON p.patid = DerivedTablename3.patid
       WHERE  p.deathdate IS NULL
       AND    p.tod IS NULL
       AND    p.accept = 1
```

The above section of SQL code performs an "INNER JOIN" on three derived tables which provide the respective first, second and third datasets. In this section of code, each bracketed portion starting "SELECT" creates a derived table corresponding to a given one of the three datasets. The derived table includes columns in respect of patient code (patid) and the date of the event that satisfies the relevant criterion for that dataset (eventdate). Thus, the "INNER JOIN" is performed on these three derived tables. Some additional conditions are added e.g. that the patient is not dead, i.e. p.deathdate IS NULL, etc. The tables are associated with labels after the bracketed code portions i.e. stack names.

As discussed above, while the above conventional technique may provide a logical intersection of multiple datasets using SQL, the execution of queries in this manner has been found to be subject to problems in terms of erratic behaviour of the search algorithm, which may result in wide variation in the execution times for such queries. While the above example is by reference to a query using SQL, this problem may also be associated with carrying out intersections of multiple datasets using other query languages.

Accordingly, the present invention seeks to provide improved methods of obtaining a dataset answering a query from a relational database.

In accordance with a first aspect of the invention there is provided;

a computer implemented method of obtaining a dataset answering a main query from a relational database using a database query language;

the method comprising providing code to cause a set of one or more processors to;

-continued

```
       AND clm.CodeListId_FK IN ( 1 )
       ) MyDerivedTable
```

Accordingly, in the example above, where two "SELECT" statements are combined in a UNION operation to provide a dataset, the code would be modified as below to provide a derived table containing the dataset;

```
(
SELECT patid, eventdate
FROM   GPRD_MEGA.dbo.[MEDEVENT] me
INNER JOIN dbo.CodeListMember clm ON clm.MemberId_FK =
me.medcode
       AND clm.CodeListId_FK IN ( 1 )
UNION ALL
SELECT patid, eventdate
FROM   GPRD_MEGA.dbo.[THERAPY] t
INNER JOIN dbo.CodeListMember clm ON clm.MemberId_FK =
t.prodcode
       AND clm.CodeListId_FK IN ( 3 )
       ) MyDerivedTable2
```

Bearing this background in mind, in order to determine the logical intersection of three datasets using a conventional technique employing SQL, the following SQL statements might be used. In this simple example, each dataset to be intersected is the result of obtaining a list of patient codes associated with events meeting a single criterion, rather than being a "UNION" of two lists of patient codes associated with events meeting different criteria. The code below returns a list of patient codes and event dates that is the intersection of the three datasets, the intersection being provide a first real result table containing a first dataset obtained from the database, the first dataset answering a first subquery that forms part of the main query, provide one or more further real result tables, the or each further real result table containing a respective further dataset obtained from the database, the or each further dataset answering a respective further subquery that forms part of the main query, and obtain a dataset from the first and one or more further real result tables answering the main query.

In accordance with the invention therefore, in order to obtain a dataset answering a main query, two or more subqueries which form part of the main query are executed, and the datasets answering these subqueries are used to provide two or more real result tables containing the respective datasets. These real result tables are then queried to obtain a dataset answering the main query. It has been found that by creating real result tables containing datasets obtained according to certain subqueries which are carried out as part of the main query, and then querying these real result tables to obtain the dataset answering the main query, an answer to a query may be provided in a more reliable and consistent manner than may be achieved using conventional querying approaches implemented using database query languages such as SQL e.g. than when a conventional approach of the type described above is used. In particular, the creation of the intermediate real result tables has been found to be particularly advantageous in addressing the problem of erratic behaviour encountered with conventional searching algorithms, which may lead to significant disparity in the speed at which results are returned, and in some cases, may result in a query failing to be answered. In embodiments, the present invention involves modifying the pure, unadulterated SQL that would be used to answer a query according to conventional techniques to cause the real result tables to be provided. The present invention may provide results in a more predictable and uniform manner. It will be appreciated that the creation of the real results tables as part of the step of answering a main query will not, in all cases, result in the query being answered more quickly than using conventional techniques. In a case where the corresponding conventional query would have returned a result without erratic behaviour, there may be a marginal increase in the time in answering the query as a result of the need to provide the result tables. However the benefit is that a query is answered efficiently in all cases, and in a more predictable timeframe.

The method may further comprise receiving an indication of the main query. The indication of the main query is preferably provided by, and thus received from, a user. The indication may be received via a computer apparatus. The indication of the main query may be provided by any suitable input or inputs. In embodiments the indication of the main query is received via a user interface. The user interface may be a web based interface. Preferably the user interface is a graphical user interface.

The main query may be indicated in various manners. In preferred embodiments the step of receiving an indication of the main query comprises receiving an indication of parameters of one or more, and preferably each, of the subqueries that form part of the main query. Preferably the indication of the parameters of the one or more of the subqueries is provided by, and thus received from, a user. The user may specify any or all of the parameters of a subquery. The user may provide an indication of the relationship between the subqueries and the main query e.g. the way in which the subqueries (or the results/answers of the subqueries) are to be combined to answer the a main query, or this may be determined automatically by the system. In preferred embodiments the results of the subqueries are combined in a predefined manner to answer the main query e.g. through an intersection (of the results) of the subqueries. In other words, the way in which the results of the subqueries are combined is not user specified. The way in which the results are combined may be predefined in that it is predefined for multiple main queries. Alternatively a user may specify the way in which the results are combined.

The method may further comprise the step of outputting the dataset answering the main query. The dataset may be output in any manner. In preferred embodiments the dataset is displayed to a user, and/or stored. Storage of the dataset may take place in any location or locations, and in any suitable memory. In some embodiments the dataset is stored in a user database separate from the main relational database.

As referred to herein, the "main query" is the overarching query which is to be executed. The execution of the main query involves the execution of various subqueries, including the first and one or more further subqueries referred to above, which are thus considered to form part of the main query. These subqueries are queries within the main query. The main query could itself be part of a higher level query, provided that it includes sub queries within it. The or each subquery may itself contain more than one query within it. The main query is, in embodiments, a user search. The sub queries are sub searches forming part of the main search.

In embodiments of the invention the main query comprises a main logical test, and the first and the or each further subquery that forms part of the main query comprises one or more respective logical subtests within the main logical test. As described above, the main logical test is preferably a predefined logical test.

In preferred embodiments the main logical test is a logical intersection test. The dataset answering the main query will then be a logical intersection of the first dataset and the or each further dataset contained in the real result tables. Thus, in embodiments, the step of obtaining a dataset from the first and one or more real result tables answering the main query comprises obtaining the logical intersection of the datasets contained in the real result tables. In some preferred embodiments the step of obtaining a dataset from the first and one or more real result tables answering the main query comprises performing an inner join operation or an intersection operation on the real result tables. In preferred embodiments where the query language is SQL, this is implemented using an "INNER JOIN" or "INTERSECTION" statement.

In general, in preferred embodiments the step of obtaining a dataset answering the main query comprises performing an intersection operation on the first and one or more further datasets, or, in embodiments using SQL, executing an "INNER JOIN" or "INTERSECTION" statement on the datasets.

It will be appreciated that the intersection or logical intersection of the datasets referred to herein is an intersection which takes into account one or more columns of the datasets. In preferred embodiments in which the method comprises receiving an indication of parameters of one or more of the subqueries, preferably from a user, the parameters are preferably parameters of one or more of the one or more logical subtests associated with a given subquery i.e. on the basis of which the logical subtest is to be performed. For example, a user may specify one or more criteria which are to be met by records in order to answer a given subquery. The user may specify any or all of the parameters of any one or ones, or each, of the subtests. As with the relationship between the main query and the subqueries, the relationship between multiple logical subtests of a subquery, where a subquery comprises a plurality of logical subtests, may be user specified, or more preferably is predefined. In embodiments therefore, the manner in which the results of the plurality of logical subtests are combined to provide the answer to the subquery is predefined. For example, the system may be arranged such that the results of the logical subtests are combined through a union operation.

In accordance with any of the embodiments of the invention, the one or more logical subtests of a given subquery may be of any type. Thus a subquery may comprise any combination of logical tests, or a single logical test. Multiple logical tests may be combined in any manner, in series or in parallel, to provide a complex logical test that provides the desired results. Preferably, when a subquery comprises multiple logical subtests, the results of the subtests are combined using a logical union operation. Of course, alternatively a logical intersection operation could be used.

It has been found that union operations on datasets e.g. using an SQL "UNION" statement, may not suffer from the same problems in terms of erratic behaviour associated with intersection operations when carried out using conventional techniques.

The logical test or tests forming part of a subquery may comprise one or more of an exclusive OR test, an inclusive OR test, an AND test, a NAND test, a NOR test, an equal to test, a not equal to test, a greater than test, and a less than test. It will be appreciated that a given one of these logical tests may be implemented in various manners, and may itself be implemented using multiple logical subtests which together provide the desired logical test. For example, a NOT test could be implemented by carrying out an "equal to" test, and then obtaining the complement of the results.

In some preferred embodiments the or a or each subquery comprises one or more "equal to" and/or "not equal to" logical tests. In embodiments in which a plurality of "equal to" or "not equal to" tests are carried out, the results of the tests may be combined as desired. The results may be combined using a logical intersection or union operation.

In one example, an "equal to" or "not equal to" logical test may be implemented by using a select command on the relational database (e.g. a "SELECT" statement in SQL). The results of the or each select command may be combined using a union or intersection operation (e.g. using a "UNION" or "INNER JOIN" command in SQL.) A union or intersection operation are effectively equivalent to an AND or inclusive OR logical test respectively.

References to an "OR" logical test herein may, unless the context demands otherwise, refer to either an exclusive OR test or an inclusive OR test. Any reference to an "OR" test may therefore be read as an "exclusive OR test or an inclusive OR test", and may be limited to one of these options unless the context demands otherwise.

In embodiments in which a subquery comprises a plurality of logical subtests, the subquery may further comprise obtaining a union of the datasets passing each of the plurality of logical subtests to provide the dataset which is the output of the subquery i.e. the first or further dataset answering the subquery which is used to provide the first or further real result table, and which is then subjected to the main logical test. In some embodiments the or a subquery may comprise obtaining a first dataset from the database which passes a first logical sub test, and at least one further dataset from the database which passes a second logical sub test, and subjecting the first and each further dataset to a union operation to provide the dataset that is the answer to the subquery. For example, a first dataset may be obtained that passes a first equal to test, and a second dataset obtained that passes a second equal to or NOT test, with these first and second datasets then being subjected to a union operation to provide the answer to the subquery. Alternatively, rather than obtaining datasets and then obtaining the union of them, the desired dataset might be obtained in a single stage using a more complex logical test.

In any of the embodiments of the invention, different ones of the first and further sub queries may use different logical tests, or combinations thereof. It will be appreciated that any one or ones of these types of test may be used to provide the datasets which, in preferred embodiments, are then subjected to a main query logical test in the form of a logical intersection test in order to provide the intersection of the datasets.

It will be appreciated that in obtaining the datasets that are the answer to a subquery may comprise additional filtering or tests. For example, results passing one or more logical tests may additionally be subjected to date filtering.

The methods of the present invention have been found to be particularly applicable to medical record databases, which may be relatively large e.g. of the order of 1 TB or greater. In this context, a main query may involve identifying patients who have had certain medical products prescribed, medical conditions diagnosed, and/or medical test performed etc. To illustrate possible forms of main and subquery by reference to this example, a main query might be a request to provide a list of patients who have been prescribed a particular product, and have had a particular condition diagnosed. A subquery may then be performed to provide a first real result table containing a first dataset being a list of patients who have been prescribed the particular product. A second subquery is then performed to provide a second real result table containing a second dataset, being a list of patients who have been diagnosed with the particular condition. A second real result table is created containing this dataset. The logical intersection of these datasets held in the real result tables is then obtained to provide a list of patients who have been prescribed the particular product and have been diagnosed with the particular condition, thus answering the main query.

Of course, the main and subqueries may be more complex than this. Further criteria may be added, such as a requirement that the patients have additionally been diagnosed with a further condition, and a third subset of data will then be obtained, and a corresponding real result table created, being the list of patients diagnosed with this condition. The third real result table containing this third subset of data is then included in the intersection to answer the query. Rather than a given dataset (obtained using a subquery) merely being a list of patients meeting a given criterion e.g. involving an equal to type logical test, more complex tests may be involved. For example, a dataset might be a set of patients who have had one condition diagnosed but not another condition, or all patients who have had either condition A or condition B diagnosed and not both conditions A and B, or all patients who have had either condition A or condition B or both conditions A and B diagnosed etc.

In accordance with the present invention, a real result table is provided containing the or each dataset obtained as answering the first or further subquery forming a part of the main query.

As is known in the art, a "real" table is a table that exists in the relational database. Such a table may also be referred to as a "physical" table. Real tables are typically stored somewhere in memory. A real table may be stored in a non-volatile or volatile memory. Depending upon their intended life, real tables may be permanent or temporary. For example, a temporary table may exist only for the duration of the execution of a limited number of queries. Temporary tables may be deleted automatically when an execution context that created them in order to answer the main query is terminated. The real result tables of the present invention may be permanent or temporary. The most appropriate type of real table may be chosen taking into account the given context. For example, temporary tables will automatically be deleted once they are no longer needed. However, permanent tables may be reused, potentially avoiding the need to create a new table each time a new result table is needed e.g. in relation to a new main query. It has been found that in some situations an existing result table may be appropriately reused in the context of a new query.

The real result tables used in the present invention are in contrast to "derived" tables, (sometimes referred to as "virtual" tables), which do not exist (i.e. in a database). A derived table is a table which is a purely logical construct, and may be represented by a statement in the query language. Such tables are often produced during execution of a main query, e.g. representing the results of a subquery forming part of a main query. A derived table is not stored anywhere, although the statement in the query language resulting in the table may be stored. As discussed in more detail below, it will be appreciated that the present invention provides a real result table where typically only a derived table may have been produced by the query language e.g. SQL. The provision of a real table has been found to improve the ease with which a query may be carried out on the various datasets obtained in order to answer the main query, in particular where the main query involves an intersection operation e.g. an SQL "INNER JOIN" or "INTERSECTION" operation, which are relatively "expensive" in data processing terms.

In accordance with any of the embodiments of the present invention, the real result tables may be stored, and the method comprises storing the real result tables. The tables may be stored in any memory, and may be stored in a volatile, or preferably non-volatile memory. The tables may be stored using any suitable data storage medium or media. In particularly preferred embodiments the tables are stored using a set of one or more memory drives. Any suitable drive may be used, but preferably the or each drive is a solid state drive (SSD). Such drives have been found to be particularly useful for storing result tables, as SSDs may provide fast access to stored data. Alternatively or additionally the set of one or more memory drives may include an optical or magnetic drive or drives e.g. a hard drive or drives. Regardless of the storage medium used, the tables may be stored in any suitable manner, and may be stored in the relational database, or in a separate dedicated result table database. Particular advantages are obtained when the result tables are stored using one or more SSDs, and in a dedicated database. This allows the result table database to be separated from the main or other databases, which can then be stored using other forms of data storage media or drive, or SSDs of a lesser specification, as the demands on the data storage media may be lower. In embodiments the real result table comprises a table structure and data filling the table structure i.e. inserted therein. Other "tables" referred to herein are also of this form.

In embodiments, the step of providing the first and the or each further real result table containing the first or a one of the one or more further datasets comprises at least filling a table structure with the dataset, and preferably comprises creating the table structure. In preferred embodiments, the step of obtaining the dataset from the database and providing the real result table may occur simultaneously. Of course in other embodiments a dataset might be obtained from the database and subsequently used to provide a real result table by filling a table structure e.g. after storing the dataset.

The step of creating the table structure may comprise using a create table command. The step of filling the table structure may comprise using an insert operation to insert data into the table structure. This insert operation may be used together with one or more select operation to select the data from a table e.g. of the relational database for insertion into the table structure. This may be known as a "subselect" operation. The dataset answering the main query may also be stored in the same manner as the real results tables e.g. preferably in a dedicated separate database, and using SSDs.

In preferred embodiments of the invention in which the query language is SQL, the step of creating the structure of the real result table may comprise using a "CREATE TABLE" statement. The following is an example of a "CREATE TABLE" SQL statement;

CREATE TABLE #s1 (patid BIGINT, eventdate datetime) will create a table called #s1 with two columns patid, eventdate The general form is CREATE TABLE <table name> (colname1 datatype, colname2 datatype, . . . colnamen datatype)

The step of filling the table structure may be implemented using one or more "INSERT" statements. In embodiments one or more "SELECT" statements is additionally used e.g. to specify the data for insertion. This may be referred to as a "subselect" operation.

One example of the use of an "INSERT" statement in conjunction with a subselect statement in SQL is;

```
INSERT INTO PEOPLE (name,age)
SELECT name, age FROM SomeTableOrAnother WHERE age > 21
```

Which will insert people over the age of 21 from the "SomeTableOrAnother" table into the "PEOPLE" table.

It will be appreciated that in some situations, where a previous stored real result table can be reused, the step of providing the result table may involve identifying a suitable existing result table answering a subquery and may not involve creating and filling the table. In some embodiments, therefore, the first and further real result tables may be created at different times, and one or more of the tables may be created in the context of a different subquery to that which forms part of the main query in accordance with the invention. The identification of an existing real result table that can be reused may be carried out by consideration of the syntax of a query. For example, in an SQL implementation, this may involve considering the syntax which indicates a derived table, and identifying whether a real result table with corresponding content already exists.

It will be appreciated that in accordance with the invention, provided that a real result table is produced, a derived table may or may not be additionally produced corresponding to the real result table. For example, a derived table of the results to be included in a real table may first be produced and used to fill the real table. In embodiments the dataset answering the main query is obtained without reference to any derived tables. In embodiments the dataset answering the main query is obtained only by reference to the first and one or more further real results tables.

In accordance with the present invention, the relational database may be any suitable such database. The database may be referred to as the "main" database. The database may be a distributed database or may be located at a single location. The database may include any number of sub databases provided that they are linked in a manner that can be considered to provide a composite database including the sub databases.

The relational database may be stored using any suitable data storage medium or media e.g. a set of one or more memory drives, which may comprise hard drives and/or solid state drives. For example, the database is stored using a set of one or more disk drives, which may be optical or magnetic e.g. hard drives. Preferably, however, the relational database is stored using a set of one or more SSDs. The first and one or more further datasets may be obtained from the database in any suitable manner. In embodiments the datasets are obtained from real tables of the relational database. In some preferred embodiments the method further comprises providing a user database separate from the main relational database for storing the results of user queries, e.g. of the main and/or subqueries, and/or for storing the real result tables created during the execution of the queries. This user database may store metadata relating to the search process. This has the benefit that the main relational database storing the data may be maintained at most times as a read only database, allowing more cost effective storage media to be used. For example, cheaper or lower specification SSDs may be used. The data may be held in the relational database using any suitable arrangement of tables, and it will be appreciated that pieces of data may be associated with other pieces of data via any direct or indirect path. As known in the art, the data indicative of specified data may be the actual data, or a pointer thereto, or similar. For example, a particular piece of data such as a unique identifier may be stored only once in the relational database, with other references to the data e.g. in other tables being in the form of pointers to the actual stored data.

It will be appreciated that obtaining the first and the or each further dataset from the relational database comprises obtaining data indicative of the dataset selected from the relational database, and the or each dataset may be obtained from the database in any of the following manners. The data indicative of the dataset may therefore comprise copies of data or pointers to data stored in the relational database, or data which in any way provides a link to the corresponding data. References to the first or further result table containing a respective dataset should be understood to refer to the result table containing data indicative of the dataset. Similarly, the data may therefore be copies of actual data, or pointers to data in the main relational database, or otherwise providing a link to the relevant data.

In preferred embodiments the relational database comprises data indicative of a plurality of unique identifiers and data indicative of attributes associated with the unique identifiers ("attribute data"). Each unique identifier may be associated with data indicative of one or more attribute. Preferably the or each subquery is performed in relation to the attributes of the unique identifiers. This is in contrast to performing the query in relation to the unique identifier. In other words, the attributes are used to determine whether a particular record can be considered to form part of the dataset answering the subquery. The main query could also be performed in relation to the attributes of the unique identifiers, but preferably is performed in relation to the unique identifiers themselves. Where the main query comprises an intersection operation, this may be performed by reference to one or more columns of the datasets, e.g. by reference to the unique identifiers but not associated attributes.

In embodiments the attributes comprise events, and data indicative of events associated with the unique identifiers is stored. In embodiments data indicative of a timing of each event is stored in association with the data indicative of the event. The events may be events in different categories, and preferably the data indicative of an event ("event data"), is associated with an event identifier e.g. code identifying the nature of the event. The unique identifier may be a code. Preferably each attribute is in the form of a code. Data providing a key to the codes may also be stored. Other attributes may be associated with the unique identifier. For example, where the identifier relates to an individual, personal information relating to the individual e.g. name, address, date of birth etc may be stored. In the preferred example of a medical record database, the records, are preferably anonymous. It will be appreciated that the data indicative of an attribute e.g. event may be specific data identifying the attribute or event, or data otherwise indicative thereof, e.g. data indicative of a date of the attribute, its nature and the unique identifier with which it is associated.

In one exemplary embodiment, each unique identifier is a patient identifier. The identifier may be in any suitable form, such as a name or preferably a code, provided that it uniquely identifies an individual. The event data associated with a or each unique identifier is preferably patient event data. The patient event data might be a unique event identifier or data otherwise indicative of a patient event e.g. an event date and/or code. The patient event data may be indicative of events selected from categories including one or more of medical events, clinical events, therapeutic events, and may comprise one or more of; medical product prescribed, medical condition diagnosed, medical consultation occurred, and test result.

Preferably the patient event data comprises an event code indicative of the nature of the event. Increasingly, medical practitioners are asked to select from certain standard descriptions when recording information about an interaction with a patient, which can be referenced by standard codes. For example, there are standard codes relating to prescribed products, medical conditions, and test results, as well as ones which are associated with standard statements which can be used to describe what took place in the consultation, and the outcomes thereof. Any of these codes may be considered to be event codes. Thus, by storing appropriate event codes associated with patient identifiers in the database, and as appropriate date information, queries may be conducted by reference to the type of event. In practice, a user may specify a list of one or more event codes in relation to a query or subquery. Typically a number of different codes may be used to describe a given type of event, e.g. medical condition diagnosed, product prescribed etc. Lists of codes including all codes relevant to a given type of event have therefore been established. The user may therefore specify a parent code associated with a relevant code list, or a pointer thereto, in relation to a query or subquery.

In embodiments, the main query is a query to identify a dataset in the form of a list of unique identifiers associated with data indicative of attributes e.g. events ("event data") satisfying two or more sets of one or more given criteria. Each subquery may provide a dataset meeting a given specified one of the sets of one or more criteria. In embodiments in which the main query comprises a main logical test, the main logical test may be a test to obtain the logical intersection of first and one or more further datasets comprising or consisting of the unique identifiers associated with attribute e.g. event data passing a respective logical sub test or tests of the respective first or further subquery. For example, the unique identifiers may be patient identifiers associated with data indicative of patient events indicative of a particular product prescribed (first criterion) and a particular condition diagnosed (second criterion). A first subquery may then determine a dataset satisfying the first criteria, and a second subquery the dataset satisfying the second criterion. In preferred embodiments the criteria are user specified, and the method comprises receiving an indication of the or each criterion from a user. In this way, the user specifies parameters of the subqueries, e.g. a logical test or tests of the subqueries, indirectly through specifying the criteria.

In the invention in any of its embodiments, a user may specify the parameters of a subquery, or the logical test(s) thereof, via a suitable user interface e.g. a graphical user interface. The user interface may be a web based interface. In some embodiments the method may comprise displaying to the user a plurality of graphical objects to be representative of the results of the or each subquery, and may comprise providing a graphical indication of the progress of each subquery by reference to the objects. The user may be able to specify the parameters of a given subquery via a graphical user interface. This may be done by reference to the graphical objects in embodiments where these are provided representative of each subquery. For example, the user may be presented with a representation of a plurality of stacks, each representative of a given subquery, to which results may be seen to be added as a subquery progresses providing the dataset associated with the subquery. The user may be able to select the number of stacks, and hence subqueries to be used and/or specify details of e.g. a logical test(s) associated with the subquery. This may also be done via a suitable graphical interface, which may illustrate the implementation of a given subquery in terms of set theory.

In preferred embodiments, regardless of the subject matter of the data stored, the first and the or each further dataset obtained and which is used to provide a result table comprises a list of unique identifiers e.g. patient identifiers. The dataset may consist of such a list, or may further comprise data indicative of an attribute e.g. event. For example the dataset may comprise a list of unique identifiers and data indicative of the nature and/or timing of an attribute e.g. event. The attribute e.g. event is the attribute or event that resulted in the unique identifier being added to the relevant dataset i.e. as answering the relevant subquery or logical test(s). In some arrangements the dataset might consist of the list of unique identifiers without associated attribute e.g. event data. This may facilitate interrogation of the result tables to obtain the dataset answering the main query, as this may be done by reference simply to the unique identifiers.

In embodiments the method comprises outputting the first and the or each further dataset. The or each dataset may be stored and/or displayed to a user. This has been found to be useful, as a user may then consider the effect of changing the parameters of the subqueries on the results, e.g. before carrying out the main query using the results of the subqueries. The display may be via a suitable user interface e.g. a graphical interface, such as a web interface. It will be appreciated that some filtering of results e.g. by date or other criteria may be carried out to provide the datasets that are the answers to the first and further subqueries. Thus, an initial dataset may be carried out which passes a logical test associated with a given subquery. A user may then apply a filter to exclude certain data from the dataset, e.g. to exclude patient identifiers associated with events passing a logical test but outside a given date range. Any additional filtering etc may be considered to be part of the relevant subquery that provides the first or further dataset. Alternatively filtering may be carried out as part of the final stage of the process, when the datasets are used to answer the main query. It is envisaged that further criteria may be imposed regarding the relationship between the datasets obtained, e.g. requiring that the first dataset must be associated with events which took place x days before the second dataset etc. This may be in absolute or relative terms. Where a relationship between datasets is imposed before intersection of the dataset, this would be usually in absolute terms, e.g. the first dataset is associated with events on specific day x, and the second with events on day x+2. These may be implemented by appropriately setting up the subquery for the dataset, or may be built into the final stage of using the datasets to provide the answer to the main query. Thus, filtering may be carried out at any stage or stages in the method.

In some embodiments, the first and each further dataset is displayed to a user in the form of a table. This table may be a derived table. In preferred embodiments, regardless of the nature of the first and further datasets, the dataset answering the main query comprises, and preferably is a list of unique identifiers e.g. patient identifiers. Preferably the main query is performed by reference to the unique identifiers rather than on attributes thereof.

In embodiments, one or more of the first and the one or more further real result tables is stored as a permanent table to enable it to be reused in a subsequent query. For example, the real result table may be a list of patient identifiers. In these cases, the stored result table may correspond to a derived table indicated in a subsequent search, which, when implementing the method of the present invention in the context of that search, will need to be provided as a real result table. This may then be achieved by identifying and using the existing stored real result table rather than creating and filling a new table.

The present invention may be used in numerous contexts where unique identifiers are involved, whether identifying objects or persons, or even events, and being associated with any other types of data e.g. event data which might relate to any type of occurrence e.g. orders placed, good manufactured etc. It will be appreciated that, where not explicitly stated, any reference to an "event" may, be replaced by a reference to "attribute" in the more general implementations of the invention.

It will be appreciated that steps may be taken to eliminate duplicate results in the final dataset. Thus, the dataset answering the main query may be a set of the distinct results obtained from performing an intersection on the first and further datasets. Steps to eliminate duplicate results may be carried out at any stage or stages, and may be carried out when performing subqueries, or when obtaining the answer to the main query from the first and further datasets answering the subqueries.

References to a "unique identifier" herein refer to an identifier that uniquely distinguishes a record in the relational database from all other records in the relational database.

It will be appreciated that other information may be taken into account when obtaining the various datasets. In preferred embodiments each event is associated with data indicative of a timing of the event is stored in the relational database. Timing information may be used to select data relating to e.g. events which occurred in a particular timeframe, and may be taken into account by adding a timing criterion to the main or subquery or main or sub logical tests, or by filtering the datasets obtained at the end of the main query. Thus a timing criterion may be taken into account at any stage in a query process. Other factors may also be considered when selected datasets, e.g., where these relate to patients, that the patient is alive e.g. no death event being associated with them etc.

While the present invention is of application to queries implemented using various relational database query languages, the database query language is most preferably a Structured Query Language (SQL). The problems of erratic behaviour discussed above have been found to be particularly associated with the use of SQL. The SQL used herein in these preferred embodiments may be any form of SQL. SQL is a commonly used language, and the subject of various ANSI and ISO standards. While there are proprietary variants of SQL associated with different relational database vendors, most vendors adhere to a core standard, usually ANSII standard 1992 as a minimum. The present invention is applicable to any of these types of SQL, and in some embodiments, the SQL meets at least the minimum requirements of the ANSII standard 1992.

As mentioned previously, in embodiments, the present invention provides a real result table where conventionally a derived table may have been used e.g. indicated by SQL syntax. In embodiments, especially where the query language is SQL, the first query and the or each further query is a query which provides a dataset from the relational database which would conventionally be indicated by a derived table, wherein the real result table is provided instead of the derived table. In preferred embodiments, the methods of the present invention may, therefore, be readily implemented by means of rewriting conventional code e.g. SQL code.

In some embodiments the method comprises providing code (e.g. conventional code) e.g. a code statement or statements which will, when executed, cause the set of one or more processors to answer a main query from the relational database, identifying a first code portion of the code that will, when executed, provide a first derived result table containing a first dataset obtained from the database answering a first subquery that forms part of the main query, and identifying one or more further code portions that will, when executed, provide one or more further derived result tables each containing a further dataset obtained from the database answering a further subquery that forms part of the main query, and modifying the first and the or each further identified code portion with a code portion that will, when executed provide a real result table containing the respective first or further dataset.

In preferred embodiments in which the query language is SQL, the first and one or more further identified code portions that are modified are "SELECT" commands. In preferred embodiments, the or each code portion used when modifying the first and the or each further identified code portion comprises a "CREATE TABLE" command, and preferably additionally an "INSERT" command in combination with one or more "SELECT" commands (which will provide a subselect operation to fill the table). Accordingly, the step of providing the code to cause the set of one or more processors to carry out the steps of the invention in any of its embodiments may comprise these additional steps. The implementation of the invention in this manner, by "stepping in" and modifying conventional e.g. SQL code is advantageous, providing a simple way to rewrite existing code to implement the method. It is envisaged that this rewriting and identifying of the code portions could be automated, or carried out in response to inputs from a user using a suitable user interface, such as a web based interface. The user may not have to specifically write new pieces of code or identify code to be modified.

The present invention enables main queries which involve the execution of larger numbers of subqueries to be answered efficiency. Any number of subqueries may be involved, providing real results table comprising respective datasets that are used in answering the main query. In preferred embodiments the method comprises obtaining a second real result table, the second real result table containing a second dataset obtained from the database, the second dataset answering a respective second subquery that forms part of the main query, and providing a third real result table, the third real result table containing a third dataset obtained from the database, the third dataset answering a respective third subquery that forms part of the main query, and obtaining a dataset from the first, second and third real results tables answering the main query. Of course, three or more subqueries may be involved, and in preferred embodiments the method comprises providing a second real result table, the second real result table containing a second dataset obtained from the database, the second dataset answering a respective second subquery that forms part of the main query, and providing one or more further real result tables, the or each further real result table containing a respective further dataset answering a respective further subquery that forms part of the main query, and obtaining a dataset from the first, second and the or each further real result tables answering the main query. In other words, three or more subqueries, and corresponding datasets and results tables are involved. Each subquery or dataset may include any or all of the features described above in relation to a given subquery or dataset, and the subqueries or datasets may be implemented in the same or different manners.

The present invention is applicable to relational databases of different sizes, but is particularly advantageous in connection with larger databases. In embodiments the database is of a size of at least 0.8 TB, and may be of at least 1 TB.

According to another aspect of the present invention there is provided a computer readable medium comprising software which, when run on a set of one or more processors, implements any one or more of, or all of, the methods described herein. The computer readable medium may be a physical, tangible, or non-transitory medium, such as a diskette, CD ROM, ROM, RAM, flash memory or hard disk.

The present invention extends to a computer program product comprising computer readable instructions executable to perform a method according to any of the aspects or embodiments of the invention.

The present invention is advantageously implemented via a web based system. In accordance with a further aspect the present invention provides a computer, preferably a server, having a set of one or more processors configured to perform the method of the invention in accordance with any of its aspects or embodiments. A user may then provide inputs via a local terminal e.g. via a web based user interface.

For the avoidance of doubt, the features described in respect of the present invention in any aspect may be incorporated in the invention in accordance with any other aspect unless mutually exclusive.

DETAILED DSCRIPTION OF THE DRAWINGS

Some preferred embodiments of the invention will now be described by way of example only, and by reference to the accompanying drawings of which;

Figure 6:
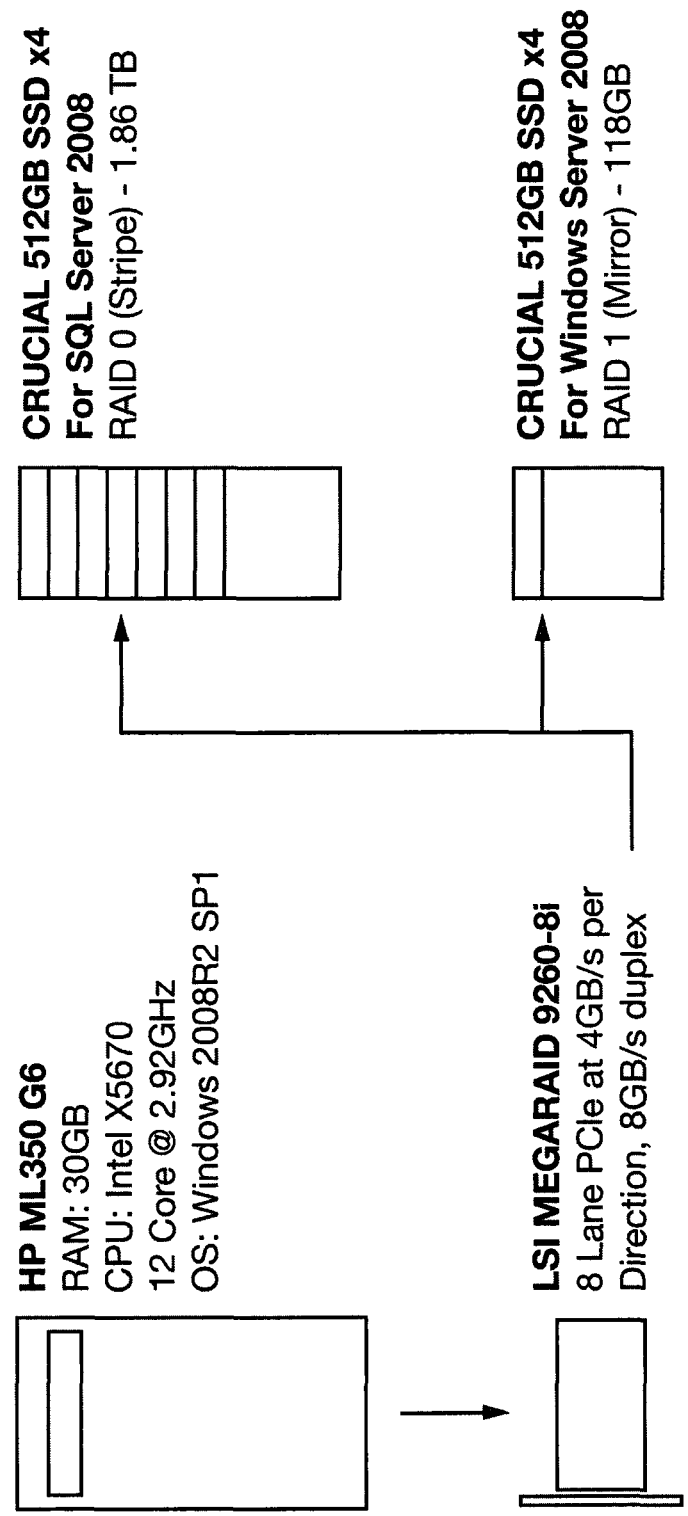

and FIG. 6 is an example of an alternative system for implementing the invention.

DETAILED DESCRIPTION OF THE INVENTION

Some preferred embodiments of the method of the present invention will now be described by reference to a relational database which is used to hold patient medical records. It will be appreciated that the techniques of the present invention are not limited to this context, and may be used in relation to relational databases storing data of any subject matter. The invention will also be described by reference to the use of the Structured Programming Language (SQL), although it is envisaged that other suitable query languages may alternatively be used. Suitable alternative commands may then be used.

Figure 1:
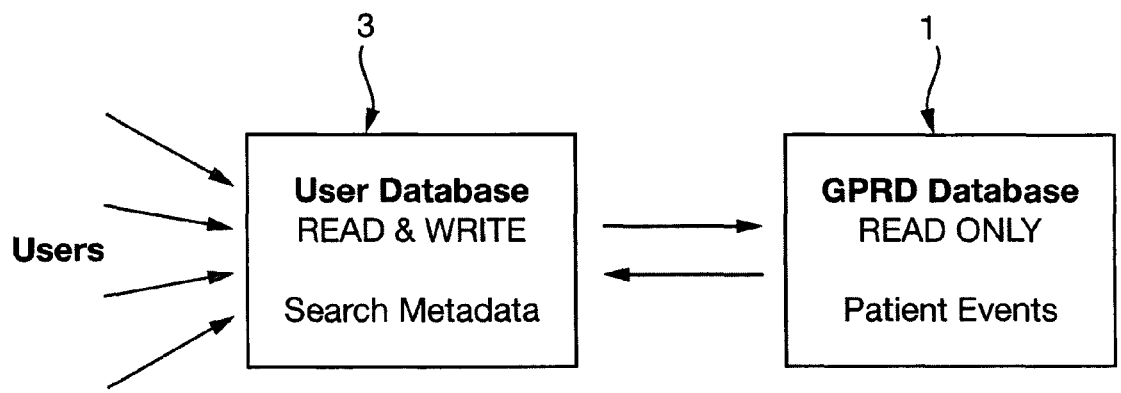
FIG. 1 illustrates schematically the arrangement of the relational database and a user database in one embodiment of the invention.

As shown in FIG. 1, a relational database (the "main" database) 1 in the form of a patient medical record database is provided. This database is in communication with a separate user database 3. The user database stores metadata relating to user queries e.g. searches, including real result tables obtained during searches, search parameters etc. The user database is a Read and Write database. The main database is generally a read only database, with writing to the database taking place only when data needs to be periodically refreshed. The user database 3 and the main database are each stored on a set of one or more SSDs. In practice, it has been found that less expensive or lower specification SSDs may be used for storing the main database. Of course, any suitable type of storage device may be used to store the user and main database, and the illustrated arrangement is only exemplary. Similarly it is not necessary that a separate user database is provided, and/or that the real result tables are stored separate from the main database.

The main database stores patient records in the form of real tables. The database includes data indicative of patient events, each being associated with a patient code which uniquely identifies the patient to whom the event relates. Additionally demographic data may be associated with the patient code. The patient event data includes at least a standardised patient event code describing the nature of the event, and an event date. The patient event data relates to medical and clinical events such as particular products being prescribed, conditions diagnosed, tests performed, as well as the occurrence and outcome of consultations with medical practitioners, and many other types of event. In general terms, the patient events may be in categories of different event types, such as product events, test events, medical events and clinical events. Each type of patient event can be described by a standard patient event code. The data is anonymous, in that data identifying the personal details of patients is not associated with the patient codes in the database.

One example of such a database, with respect to which the present invention has been developed, is the "General Practice Research Database" (GPRD). The GPRD is a computerised database of anonymised medical records. The GPRD database now forms part of the Clinical Practice Research Datalink (CPRD) (www.cprd.com), which will combine the GPRD database with the Health Research Support Service (HRSS). The records are derived from primary care, and the data is linked to other healthcare data. The database is of a size in the order of 1.2 TB at present, and is used by healthcare professionals, academics, government agencies, regulators and research bodies among others. For example, data may be extracted for the purposes of conducting clinical trials. By reference to the medical record database, a user may wish to identify a list of patient identifiers i.e. codes identifying patients who are associated with patient events matching multiple patient event criteria i.e. passing multiple logical tests. For example, this might be a list of patient codes identifying patients who have been prescribed a particular drug and have a particular medical condition, i.e. those patient codes in the database which are associated with the patient events having the patient event codes for the drug and condition. In many cases it is necessary to determine patient codes for patients associated with patient events matching three or more search parameters e.g. patient event criteria. A patient event criteria might simply be the existence of a patient event of a particular type associated with a patient, or a more complex set of event criteria, such as that the patient is associated with a first patient event but not a second patient event e.g. has a particular medical condition but has not been prescribed a particular drug.

Obtaining such a list of patient codes involves finding a logical intersection of two or more datasets obtained from the main database. These would be the lists of patient codes associated with events meeting each respective set of one or more event criteria. This type of operation has previously been carried out using conventional methods implemented via SQL as described in the background section above. However, finding an intersection between datasets using SQL, especially in a database of a size of the order of the GPRD database, can be problematic. Sometimes results are returned in a matter of seconds, while the results of another, similar query, might not be returned for days, or even may fail to be returned at all. This stems from the erratic behaviour of the query language when querying data held in the main relational database to obtain an intersection of datasets of interest e.g. using an SQL "INTERSECTION" or "INNER JOIN" operation. It is unclear as to what causes this erratic behaviour, or exactly what it involves, but it is believed that this may be caused by the search algorithm scanning data when attempting to find an intersection of the data during the search process in an inappropriate order. The problem is exacerbated for larger datasets and/or when larger numbers of datasets are intersected. In contrast, it has been found that union operations, e.g. implemented using a "UNION" command in SQL, may proceed in a more predictable manner when implemented using conventional techniques. The problems associated with performing intersection operations may stem from the fact that such operations are relatively "expensive" in data processing terms.

An example of the way in which an intersection of multiple datasets from the main database 1 might be obtained using a method of the present invention will now be described.

A user wishes to obtain a list of patient codes representing patients who are associated with patient events being; a diagnosis of medical condition X or a prescription of medical product Y; a positive medical test for A, B or C; and additionally a prescription of product D and not E. The user provides the relevant query or search criteria via a suitable graphical user interface. In a simple example, medical condition X might be asthma, product Y might be aspirin, A, B or C may be diabetes, high cholesterol and anaemia, and products D and E might be particular forms of statin drug. The present invention may advantageously be implemented using a web based interface allowing users to intuitively select search criteria. For example, the main and user databases may be held on a central server, with the user supplying the search criteria via a local user terminal.

The execution of this main query or search will involve the execution of three sub queries or searches which form part of the step of answering the main query. The first subquery is to find those patient events having an event code representing a diagnosis of medical condition X or prescription of product Y. This can be implemented using an inclusive OR logical test, with those patient events having an event code for diagnosis of medical condition X or the prescription of product code Y, passing the test. Alternatively, two separate equal to logic tests may be performed, with a union of the two sets of results then being obtained. In SQL, this may be implemented by carrying out by executing two "SELECT" statements on the main database, and a "UNION" operation on the resulting datasets.

The second subquery is to find the list of patient events which have the event code for a positive medical test for condition A, B or C. Again, this will involve an inclusive OR test, or a series of "equal to" tests with a union operation, which can be implemented using "SELECT" and "UNION" commands in SQL.

The third subquery is to find the list of patient events having the event code associated with the drug D and not E. This test will involve a logical test to find those patient events having a code equal to code D, and those patient events having a code not equal to code E, and then determining the intersection of these datasets in an AND test. This could be conducted by performing a first "equal to" test to find events having event code D, and another equal to test having an event code equal to E. The complement of the set of results obtained by performing the "equal to" event code E test may then be obtained and intersected with the set of results obtained by performing the "equal to" event code D test. Alternatively, a "not equal" to event code E test may be performed directly and the results intersected with the "equal to" code D results.

The above example is merely one possibility. A main query may involve subqueries utilising any combination of logic tests, or even a single test e.g. patient event code equal to a given code.

By way of illustration of one implementation, a search or query of this type, involving a plurality of sub queries or searches, may be implemented by providing a "stack" of data corresponding to each subquery. For example, a first stack would be the data stack to act as a container for patient events having codes passing the first subquery. A second and third stack are then provided for patient events having codes passing the second and third subqueries respectively. Patient events may be added to respective stacks when passing the respective logical subtest (which may be made up of multiple tests) associated with a given stack. The stack is a useful way of thinking of each set of data answering a given subquery, acting as a container for the dataset. The user may be provided with a graphical representation of the stacks to illustrate the search being undertaken.

The use of stacks provides a way of illustrating visually to the user the actions being taken in terms of set theory. It is envisaged that a user may input a given main query by setting up a desired number of stacks via the graphical user interface, and providing an input or inputs to specify the criteria to be met by data which is to be used to fill the stacks. In other words, the user may specify parameters of the subquery e.g. logical sub test(s) to be associated with each stack. This may be done by specifying the set of one or more patient event criteria for that stack e.g. the logic test(s) to be passed before a patient event may be added to the stack. A given patient event criterion might be thought of as a "card" for the relevant stack which the user specifies. Thus the user may associate one or more "cards" with each stack. The "card" indicates parameters of a sublogical test within the subquery for a given stack e.g. an "equal to" or "not equal to" test, and by reference to product code D. The way in which the results of the logical tests associated with each card are combined may be predefined for a stack e.g. such that the results are combined in an inclusive OR test e.g. using a union operation.

The user may be provided with an intuitive interface to indicate the subqueries or logical subtests to be performed without needing to understand the details of set theory. Of course, stacks need not be represented visually or be set up by a user. It is envisaged that the use of stacks or containers for the datasets can be used internally by the system to organise the data which is to be included in the real result tables in accordance with the invention.

As described above, in answering each subquery, a dataset is obtained from the main database including the patient events which pass the logical test(s) associated with that subquery. In the illustrative example, this is the dataset added to the "stack". A patient event may be represented in the dataset in varying ways, provided that it reflects at least the patient code associated with those patient events passing the logical test. Thus, when a patient event is determined as passing the logical test associated with one subquery, in a simple case, just the patient code for the patient associated with the event may be added to the dataset for that query. In other words, it is the patient code rather than the event which is added to the dataset or stack, but it has been selected by reference to the patient event associated with the patient code which has passed the necessary logical test. The patient code is indicative of a matching event.

In some preferred arrangements, in addition to the patient code associated with each patient event passing the logical test being added to the dataset for a given subquery or stack, patient event data may be added. In some arrangements a date associated with the event is also added to the dataset. In addition, the event code associated with the event may also be added. A pointer may be added to the actual medical record describing the patient event in some cases. Various other possibilities exist. For example, rather than extracting the event date and event code where appropriate, in some arrangements just the relevant pointer to the medical event record in the database may be associated with the patient code, as this can be used to access the event date and code. Extracting the event code and date or other information may facilitate filtering of the results by criteria relating to these fields, however.

It will be appreciated that the same patient code may be added multiple times to the same stack, if there are multiple matching patient events associated with the same patient. Duplicate patient code entries may be removed at a final stage of the query process when an intersection of the datasets held in the different stacks is performed.

Each result set consisting of the patient code, and any further patient event data e.g. event date or event code, which is added to a dataset as passing the logical test for a given subquery, or added to a stack where stacks are used, may be considered as a "matching" patient event dataset. For a user, this may be represented graphically, such that the user can see each stack being filled with the records which have passed the relevant logical test. The patient event dataset obtained as answering a logical test associated with the subquery for each stack can be considered a "card" dataset which is added to the relevant stack where the stack system is used. As discussed above, where a subquery involves multiple logical tests, which may be represented by respective "cards", there will be multiple card datasets being the results of the different logical tests which are combined e.g. in a union operation to obtain the "stack" i.e. subquery dataset.

Once all the subqueries e.g. associated with each stack have been executed, the main query is answered by determining the list of patient codes that is the logical intersection of the three lists of patient codes obtained in the three sub queries, or, in the example where the results of the subqueries are held in stack, by obtaining the intersection of the stack datasets of the three stacks. This may be referred to as a "main" logical test. This is performed by reference to the patient codes. At this stage, a dataset answering the main query may be provided to a user, e.g. being output via a display, and/or stored in the user database 2 as desired. When the intersection is performed, suitable code is applied to ensure that only distinct results are returned, removing any duplicate patient codes from the final dataset for output.

Figure 2A:
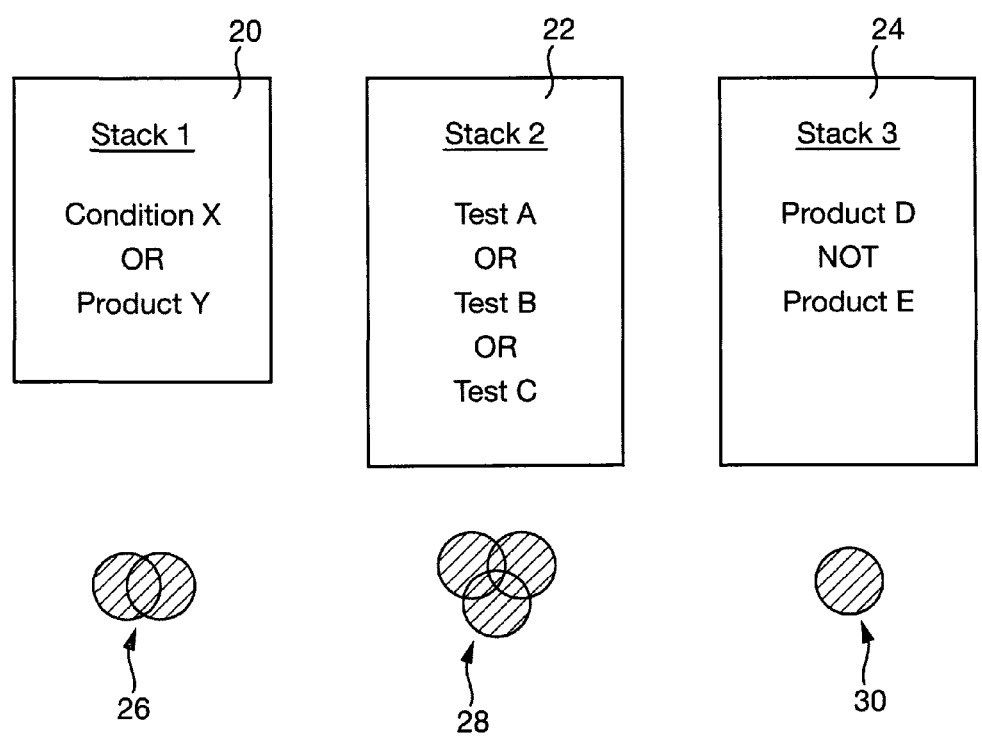
FIG. 2A illustrates stacks of data answering subqueries that are to be combined.
Figures 2B, 3:
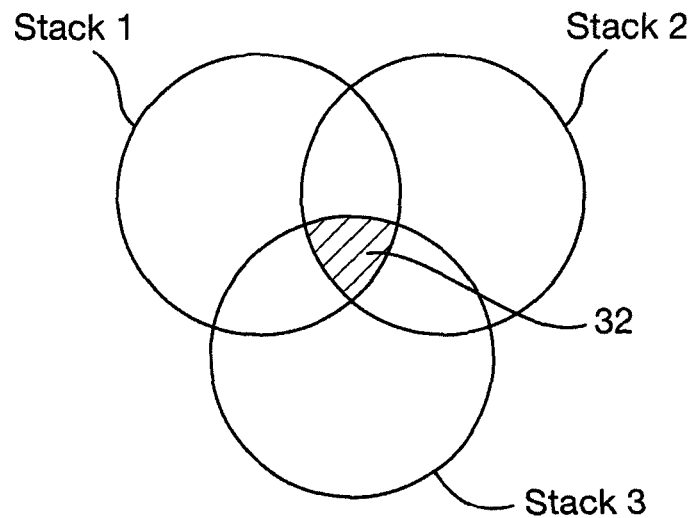
FIG. 2B illustrates the way in which an intersection of the data stacks is obtained in one embodiment of the invention.
FIG. 3 illustrates an exemplary dataset answering a subquery.

One particular example of a method using stacks is illustrated by reference to FIGS. 2A and B. FIG. 2A shows the three stacks, 20, 22, 24 which are used to hold card datasets in the form of patient codes and patient event data associated with patient events passing each of the three subqueries i.e. logical tests as indicated in the Figure. Venn diagrams 26, 28 and 30 illustrate the set of patient events which is sought in each subquery i.e. which will pass the relevant logical test, the set of desired codes being shaded. FIG. 2B illustrates the intersection 32 between the sets of patient events held in each stack 20, 22, 24, being shaded. This intersection is the set of patient events that will answer the main query.

FIG. 3 illustrates an example of a data set which is added to each "stack" for those patient events passing the logical test associated with the stack. The data set includes, for each passing patient event, the patient code for the patient associated with the patient event, together with the event date. This dataset is can be referred to as a "card" dataset. In this arrangement the card is in the form of a two column result set. In some cases, where the logical test associated with the stack included a "not" logical test, e.g. that a patient did not have a given condition at a particular time e.g. there is no patient event code matching the condition applicable at the relevant time, the event date will be shown as "Null". In other words, the patient event added to the stack may be a null event. The "card" may become part of the dataset that is used to provide the real result tables used in the method of the present invention, but at least when added to a stack is simply a piece of code e.g. SQL, (a rule), which when used in conjunction with a piece of metadata such as a code list, will create a two column result set as shown in FIG. 3. Thus the card may be a derived table.

In the above description, it will be appreciated that in addition to the logical sub tests and main test described, further filtering of data may occur at various stages. For example, date filters may be applied e.g. by a user, to return only patient events and associated patient codes associated with events occurring in a particular timeframe. Filtering may be carried out before running a subquery, or advantageously afterwards, before the final intersection operation is performed. The use of "stack" type representations may facilitate filtering of data e.g. by date. Users may experiment with applying different filters upon the dataset before it is intersected with the other datasets, or which could be applied during the intersection stage to provide the final answer to the main query. It is possible to also add filters governing a relationship between different stacks e.g. the patient events in stack 1 must have occurred n days before those events in stack 2. This would typically be by reference to absolute dates if the filter is applied in relation to the stacks, although relative dates could be used, particularly if the filter were applied at the intersection stage. An earliest or latest event requirement may be applied such that each stack only includes the latest patient event associated with a given patient code in a particular timeframe.

The key to the present invention is the way in which the intersection operation is performed on the datasets found to pass each subquery e.g. logical sub test or tests. The datasets are the patient codes associated with patient events passing the query as described above, with any additional patient event information. In the illustrated embodiments, these would be the datasets in the form of the union of the sets of cards held in each stack.

Figure 4:
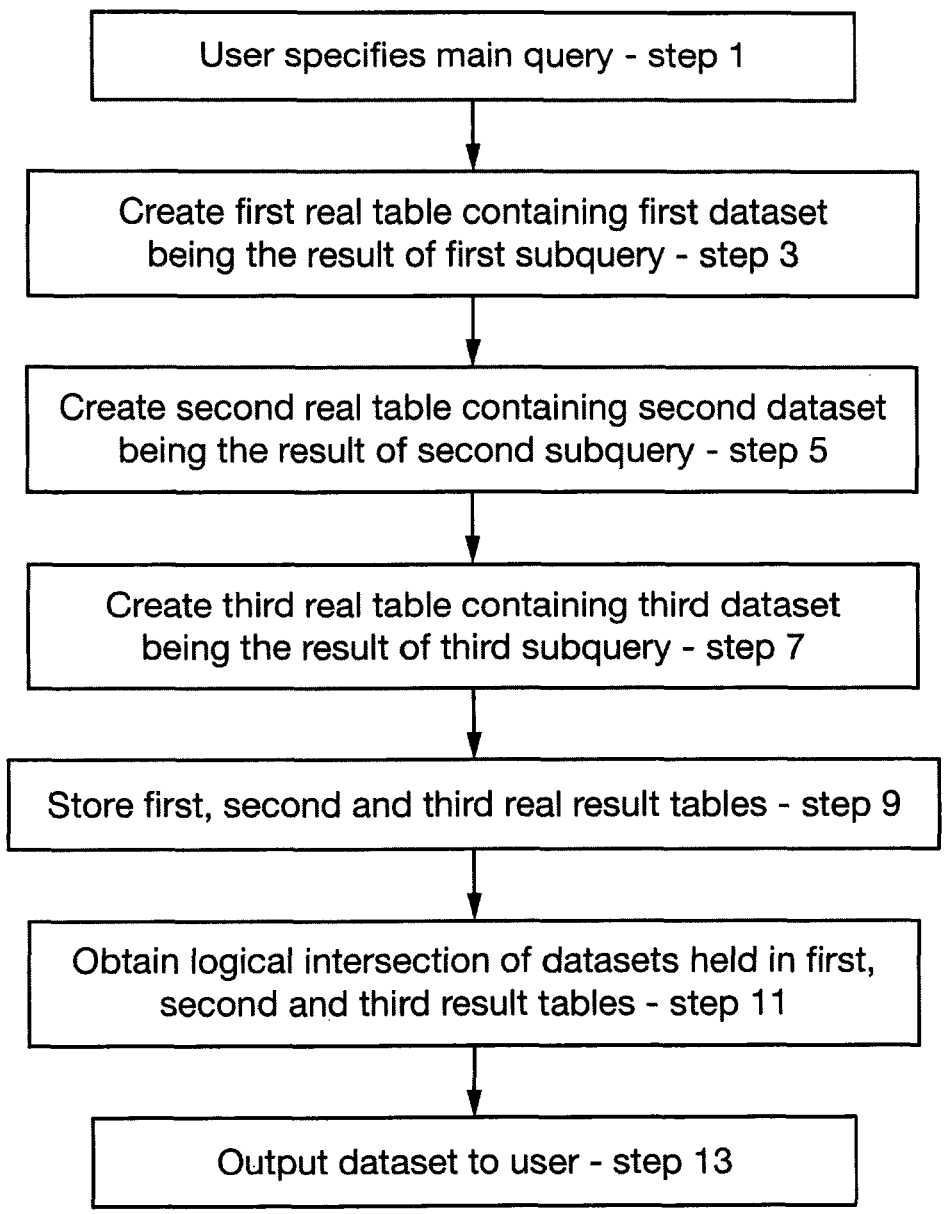
FIG. 4 is a flowchart illustrating one embodiment of the invention.

For simplicity we will consider a case where each dataset includes the patient ID and event date for those patient events from the main database which have a code matching a specified code e.g. a given prescribed product code. This scenario is described by reference to the flow chart in FIG. 4.

The user specifies the main query, being a search for patient codes associated with all three patient events of interest—step 1. The user may do this via a web based graphical user interface, specifying the three patient codes. This may be done by a user specifying three stacks for holding the datasets in respect of each subquery as described above, and specifying one or more patient event codes for each, and the logical sub test associated with each stack e.g. patient event code equals the specified code or codes. The user may specify a code list including the one or more codes associated with a given event. For example, where the user is interested in finding a list of patients with a diagnosis of asthma, there may be a code list of multiple event codes indicative of asthma e.g. 20 or even 50 codes. The user may specify a parent event code or pointer thereto which is associated with the relevant code list for an event. Thus, the user may not specify each event code individually. The requirement that the patient codes returned must be associated with all three stacks, i.e. that the intersection of the datasets is required, may be predefined. The system is set up such that the intersection of the datasets obtained for each stack will be determined. The steps of specifying the patient event code or codes and the nature of the logical test may be considered as specifying parameters of the logical test for that stack, and may be thought of as specifying a "card" for the stack.

In this example the main query may be to provide a list of patient codes for those patients who have all of the following associated patient events; a diagnosis of X, a test for Y and a prescription of drug Z. These are described by the relevant patient event code i.e. [MEDEVENT] for the diagnosis and test events, and [THERAPY] for the prescription event.

In step 3, a first real table of results is created and filled with a first dataset, being the result of a first subquery performed on the main database (GPRD_MEGA) to obtain a dataset consisting of those patient codes (patid) and the associated event date (eventdate) associated with events passing a first logical subtest. The real result table may be obtained using a "CREATE" command to provide the table structure, and an "INSERT" command in combination with a "SELECT" command to fill the table with data. The first logical test is that the event has a code equal to the code for diagnosis of X. This is the subquery specified by the user in relation to the first stack.

A second real table of results is created and filled with a second dataset—step 5. This dataset is obtained by performing a second subquery on the main database to obtain the patient codes of patients associated with an event being a test for Y, using a similar equal to logical test. This corresponds to the second subquery specified by the user in relation to the second stack.

A third real table of results is created and filled with a third dataset (step 7), being the results of a third subquery based on a logical test which returns those patient codes associated with events having the code for the prescription of Z. This again is a subquery which has been specified by the user, in this case in relation to the third stack. The second and third datasets are similarly lists of patient codes and associated event dates. The first, second and third datasets are obtained by reference to the event data associated with the patient codes. In SQL this may be performed using "SELECT" statements based on the search criteria.

All three real result tables of data are stored in the user database—step 9. The relevant datasets may be displayed to the user by adding virtual "cards" indicative of the sets of data i.e. patient code and associated event date to the relevant stack. In this case there would be one card per stack.

In step 11, an intersection operation is performed to determine the logical intersection of the datasets held in the three real result tables by reference to the patient codes. This can be thought of as intersecting "stack" datasets. In SQL this may be by using an "INNER JOIN" command. This provides a list of patient codes and event dates which pass the main query. This dataset is output to the user by displaying the dataset—step 13. The dataset is also stored in the user database.

It will be appreciated that the intersection operation herein may be with respect to one or more columns of the real result tables containing the datasets. In the example, the intersection takes account of the patient codes in the tables, but not the associated event dates or other associated event information. To illustrate the way in which this method differs from conventional methods, we will refer to the underlying code.

Returning now to the illustration by reference to FIG. 4, in order to obtain the three datasets discussed above by reference to FIG. 4 and then determine the intersection of the datasets, the following SQL statements might be conventionally used, involving indicating derived tables representing datasets, and then performing an inner join on the datasets as explained in the background above. The code below has been modified to include labels for the datasets corresponding to stack names for the stack type implementation used in the preferred embodiments of the invention. These include comments in italics identifying the portions of code giving rise to derived tables;

```
/************************************************************************/
SELECT DISTINCT
    p.*
FROM    GPRD_MEGA.dbo.patient p
    INNER JOIN (
                    -- FIRST derived table
                    SELECT patid, eventdate
                    FROM   GPRD_MEGA.dbo.[MEDEVENT] me
                        INNER JOIN dbo.CodeListMember clm ON clm.MemberId_FK = me.medcode
                            AND clm.CodeListId_FK IN ( 1 )
                ) stack1 ON p.patid = stack1.patid
    INNER JOIN (
                    -- SECOND derived table,
                    SELECT patid, eventdate
                    FROM   GPRD_MEGA.dbo.[MEDEVENT] me
                        INNER JOIN dbo.CodeListMember clm ON clm.MemberId_FK = me.medcode
                            AND clm.CodeListId_FK IN ( 2 )
                ) stack2 ON p.patid = stack2.patid
    INNER JOIN (
                    -- Third Derived table
                    SELECT patid, eventdate
                    FROM   GPRD_MEGA.dbo.[THERAPY] t
                        INNER JOIN dbo.CodeListMember clm ON clm.MemberId_FK = t.prodcode
                            AND clm.CodeListId_FK IN ( 3 )
                ) stack3 ON p.patid = stack3.patid
    WHERE   p.deathdate IS NULL
    AND     p.tod IS NULL
    AND     p.accept = 1
```

By way of illustration of the scale of the datasets which may be involved in the context of a GPRD query, the first dataset may hold 9 million patient events, the second dataset may hold around 0.5 million patient events, and the third dataset may hold 32 million patient events. The size of the final dataset which is the intersection of the datasets may be 11,427 rows of data e.g. patient codes. Such a query may take many hours to be returned using the above technique using conventional SQL code statements. In one test, a query using datasets of this size was returned in 11 hours.

The way in which the present invention addresses this problem will now be described.

In essence, the present invention replaces the three derived tables indicated by the "SELECT" commands in the conventional SQL code above with real tables of the data. The intersection is then performed on the data held in these real tables.

In order to rewrite the above conventional SQL code statement to implement the method of the present invention, three real tables must be created using the CREATE table command. The following commands create three suitable real tables for filling with the first, second and third datasets respectively, having columns being patient ID, Event date and Event Time.

```
CREATE TABLE #s1 (patid BIGINT, eventdate datetime)
CREATE TABLE #s2 (patid BIGINT, eventdate datetime)
CREATE TABLE #s3 (patid BIGINT, eventdate datetime)
```

Next, each table is filled with data from the first, second and third dataset respectively. This is the data corresponding to that which was held in each derived table according to the conventional technique discussed above.

The SQL command to fill the first real table with the first set of data (9 million rows in the example) is;

```
INSERT INTO #s1 WITH ( TABLOCK ) ( patid, eventdate )
    SELECT patid, eventdate
    FROM   GPRD_MEGA.dbo.[MEDEVENT] me
        INNER JOIN dbo.CodeListMember clm ON
            clm.MemberId_FK = me.medcode
            AND clm.CodeListId_FK IN ( 1 )
```

This was done in 4 seconds in one test.

The second real table is then filled with the second dataset corresponding to the 656,000 rows of data in the second derived table. This was done in around 0.01 secs in one test. The code for doing this would be;

```
INSERT INTO #s2 WITH ( TABLOCK ) ( patid, eventdate )
    SELECT patid, eventdate
    FROM   GPRD_MEGA.dbo.[MEDEVENT] me
        INNER JOIN dbo.CodeListMember clm ON
            clm.MemberId_FK = me.medcode
            AND clm.CodeListId_FK IN ( 2 )
```

Next the third table is filled with the data corresponding to the third derived table discussed above (32 million rows), which was done in around 12 seconds in one test.

```
INSERT INTO #s3 WITH ( TABLOCK ) ( patid, eventdate )
    SELECT patid, eventdate
    FROM   GPRD_MEGA.dbo.[THERAPY] t
        INNER JOIN dbo.CodeListMember clm ON
            clm.Memberid_FK = t.prodcode
            AND clm.CodeListId_FK IN ( 3 )
```

Next the standard SQL code is augmented to cause it to use the real result tables that have been created in the inner join operation that provides the intersection of the datasets. The code was executed to obtain the intersecting dataset in around 5 seconds in one test. The following code may be used for this purpose. The "SELECT DISTINCT" command removes duplicate patient codes.

```
SELECT DISTINCT
    p.*
FROM    GPRD_MEGA.dbo.patient p
    INNER JOIN #s1 stack1 ON p.patid = stack1.patid
    INNER JOIN #s2 stack2 ON p.patid = stack2.patid
    INNER JOIN #s3 stack3 ON p.patid = stack3.patid
WHERE   p.deathdate IS NULL
    AND p.tod IS NULL
    AND p.accept = 1
```

This is the dataset answering the main query which is output to a user e.g. via a display, and/or storage in the user database.

Finally, the real tables created can be deleted as they are no longer needed once the final dataset has been produced and output to a user. The following code may be used for this purpose.

```
DROP TABLE #s1
DROP TABLE #s2
DROP TABLE #s3
```

Alternatively, rather than using temporary result tables, the tables may be kept as permanent tables, such that they may be used in future queries, avoiding the need to create new tables each time a new query is encountered. This may provide some savings in terms of processing time. In the above example, the method might, rather than creating and filling a given real result table, involve identifying an existing stored real result table which can be re-used in relation to the given new subquery. This may be achieved by consideration of the derived table indicated by the SQL syntax, and determining whether an existing stored real result table has valid content to enable it to be reused as the real result table for a given new subquery. A further example of the present invention is as follows. This example is similar to that described above, but additionally shows the way in which a "UNION" statement is used to combine two datasets to provide the first dataset. Furthermore, this example involves intersecting only two datasets, and hence only involves creating two real result tables. The timings for providing the real result tables refer to the times when executing the code on the GPRD database.

```
SELECT DISTINCT
    p.*
    FROM    GPRD_MEGA.dbo.patient p
        INNER JOIN (
            SELECT patid, eventdate
            FROM   GPRD_MEGA.dbo.[MEDEVENT] me
            INNER JOIN dbo.CodeListMember clm ON clm.MemberId_FK =
me.medcode
```

```
                                        AND
clm.CodeListId_FK IN ( 1 )
                        UNION ALL
                        SELECT patid, eventdate
                            FROM    GPRD_MEGA.dbo.[THERAPY] t
                                INNER JOIN dbo.CodeListMember clm ON clm.MemberId FK =
t.prodcode
                                        AND
clm.CodeListId_FK IN ( 3 )
                        ) stack1 ON p.patid = stack1.patid
            INNER JOIN (
                        SELECT patid, eventdate
                        FROM    GPRD_MEGA.dbo.[MEDEVENT] me
                                INNER JOIN dbo.CodeListMember clm ON
clm.MemberId_FK = me.medcode
                                        AND
clm.CodeListId_FK IN ( 2 )
                        ) stack2 ON p.patid = stack2.patid
    WHERE   p.deathdate IS NULL
            AND p.tod IS NULL
            AND p.accept = 1
/*******************************************************
Next we create two tables
*******************************************************/
CREATE TABLE #s1 (patid BIGINT, eventdate datetime)
CREATE TABLE #s2 (patid BIGINT, eventdate datetime)
/*******************************************************
Insert data into the first table - (took ~ 4 secs in one trial)
*******************************************************/
INSERT  INTO #s1 WITH ( TABLOCK ) ( patid, eventdate )
        SELECT patid, eventdate
            FROM    GPRD_MEGA.dbo. [MEDEVENT] me
                    INNER JOIN dbo.CodeListMember clm ON clm.MemberId_FK =
me.medcode
                                        AND clm.CodeListId FK IN
( 1 )
            UNION ALL
            SELECT patid, eventdate
                FROM    GPRD_MEGA.dbo.[THERAPY] t
                        INNER JOIN dbo.CodeListMember clm ON clm.MemberId_FK =
t.prodcode
                                        AND clm.CodeListId_FK IN
( 3 )
/*******************************************************
Insert data into the second table - (took ~ 0.01 secs in one trial)
*******************************************************/
INSERT  INTO #s2 WITH ( TABLOCK ) ( patid, eventdate )
            SELECT patid, eventdate
                FROM    GPRD_MEGA.dbo.[MEDEVENT] me
                        INNER JOIN dbo.CodeListMember clm ON clm.Member Id_FK =
me.medcode
                                        AND clm.CodeListId_FK IN
( 2 )
/***************************************************************
Augment the SQL syntax to use the real result tables that have been created
and filled.
In one test, executing the following "INNER JOIN" operation on the result
tables returned 11,427 rows in ~ 5 seconds
***************************************************************
/
SELECT DISTINCT
            p.*
    FROM    GPRD_MEGA.dbo.patient p
            INNER JOIN #s1 stack1 ON p.patid = stack1.patid
            INNER JOIN #s2 stack2 ON p.patid = stack2.patid
    WHERE   p.deathdate IS NULL
            AND p.tod IS NULL
            AND p.accept = 1
/*******************************************************
Clean up
*******************************************************/
DROP TABLE #s1
DROP TABLE #s2
```

Result tables may be created as background tasks asynchronously in response to events being triggered via the user interface. Tables may be created using SQL Server Service Broker. Filling the tables in the background may provide a more efficient process.

It may be seen that the creation of real result tables does involve some additional time, in the order of a few seconds, to set up and fill the tables. However, it has been found that this additional step provides benefits in terms of avoiding the erratic behaviour associated with conventional methods in which SQL code is provided that tries to perform an intersection operation on data which is held in derived tables, rather than providing real results tables upon which to perform the intersection. In many cases the results may be returned quicker in accordance with the invention, although this is not necessarily the case. The benefit is that the problems in which results are returned in unpredictable timeframes, and potentially not for days in some cases, is avoided, and the time for providing results has been found to be more consistent and predictable.

The present invention may deliver search results in near real time, and may be implemented via a web based browser user interface. This provides great flexibility to users to experiment with changing search criteria, and considering the impact on results, allowing appropriately patient cohorts to be reliably and easily selected.

Figure 5:
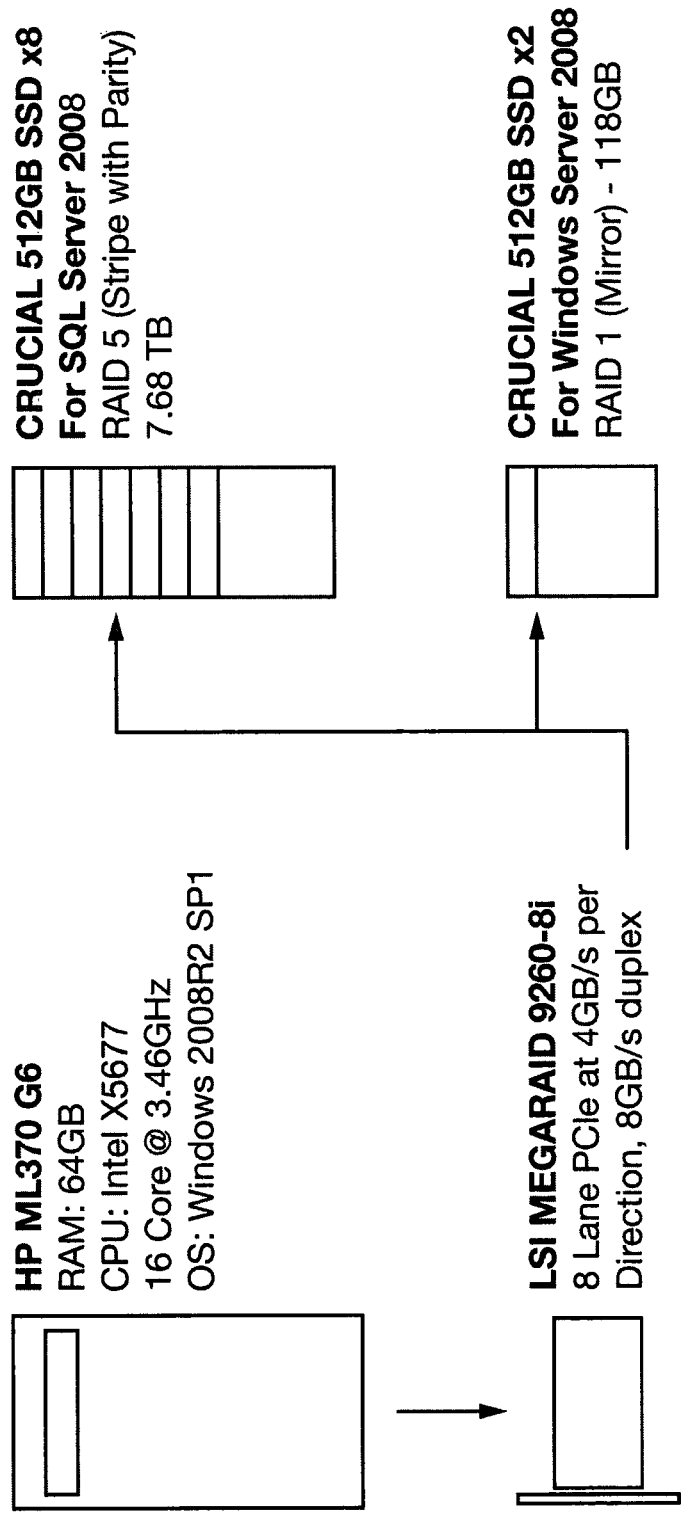
FIG. 5 is an example of one system for implementing the present invention.

FIG. 5 illustrates a first exemplary system which was used to implement the present invention in relation to a test using the GPRD, and FIG. 6 illustrates a second exemplary system which might be used in conjunction with a larger database.

The invention claimed is:

1. A computer implemented method of obtaining a dataset answering a main query from a relational database using a database query language, the method operable on a computer system comprising a set of one or more processors, the method comprising the steps of:
    providing a data stack corresponding to a first subquery that forms part of the main query, wherein the main query comprises a main logical test, and the first and each further subquery that forms part of the main query comprises one or more logical sub tests, wherein the data stack acts as a container for events having codes passing the first subquery;
    displaying, on a user interface, actions corresponding to the first data stack, the actions further comprising specifying logical sub tests used to fill the first data stack;
    adding a first dataset obtained from the database to the first data stack;
    providing a first real result table containing the first dataset obtained from the database using the first data stack, the first dataset answering the first subquery that forms part of the main query;
    providing one or more further data stacks corresponding to one or more further subqueries that form part of the main query, wherein each of the one or more data stacks acts as a container for events having codes passing the one or more further subqueries;
    displaying, on a user interface, actions corresponding to the one or more further data stacks, the actions further comprising specifying logical sub tests used to fill the one or more further data stacks;
    adding a respective further dataset obtained from the database to each of the one or more further data stacks;
    providing one or more further real result tables, each of the one or more further real result tables containing a respective further dataset obtained from the database, each of the one or more further datasets answering a respective further subquery that forms part of the main query; and
    obtaining a dataset from the first real result table and the one or more further real result tables answering the main query, wherein the dataset is displayed on the user interface.

2. method of claim 1, wherein the main query is a logical intersection test, wherein the dataset obtained from the first and one or more further real result tables answering the main query is a logical intersection of the first and one or more further real result tables.

3. The method of claim 1, wherein the first and each further logical subtest comprises one or more "equal to" or "not equal to" logical tests.

4. The method of claim 1, wherein, when the subquery comprises multiple logical subtests, the results of the subtests are combined using a logical union operation.

5. The method of claim 1, wherein the real result tables are stored using a set of one or more Solid State Drives.

6. The method of claim 1, wherein the real result tables are stored in a dedicated result table database separate from the main relational database.

7. The method of claim 1, wherein providing the first and each further real result table comprises creating the real result table and filling the table with the dataset.

8. The method of claim 1, wherein said database query language is a Structured Query Language (SQL).

9. The method of claim 8, wherein providing the first and each further real result table comprises using a "CREATE TABLE" command to create the table structure and an "INSERT" command in combination with one or more "SELECT" commands to fill the table structure.

10. The method of claim 8, wherein the step of answering the main query involves executing an "INTERSECTION" or "INNER JOIN" command on the first and one or more further real result tables.

11. The method of claim 1, further comprising receiving an indication of the main query from a user, preferably via a web based interface.

12. The method of claim 1, comprising receiving an indication of the parameters of the first and each further subquery from a user.

13. The method of claim 12, wherein the first and each further subquery comprises one or more logical tests, and the method comprises receiving, from a user, an indication of parameters on the basis of which one or more of the logical tests is to be performed.

14. The method of claim 1, further comprising the step of outputting the dataset answering the main query, preferably wherein the dataset is displayed to a user, and/or stored.

15. The method of claim 1, comprising;
    providing code which will, when executed, cause the set of one or more processors to answer a main query from the relational database,
    identifying a first code portion of the code that will, when executed, provide a first derived result table containing a first dataset obtained from the database answering a first subquery that forms part of the main query, and,
    identifying one or more further code portions that will, when executed, provide one or more further derived result tables, each further derived result table containing a respective further dataset answering one or more further subquery that forms part of the main query, and, modifying the first and each further identified code portion to provide a code portion that when executed will provide a real result table containing the respective first or further dataset.

16. The method of claim 15, wherein the query language is SQL, the first and one or more further identified code portions are "SELECT" commands and the or each code portion modifying the first and each further identified code portion comprises a "CREATE TABLE" command, and preferably an "INSERT" command in combination with one or more "SELECT" commands.

17. The method of claim 1, wherein the first and each further dataset is a list of unique identifiers and associated attributes, preferably events, and the dataset obtained from the first and one or more further real result tables is a list of unique identifiers.

18. The method of claim 17, wherein the or each subquery is performed by reference to the attributes.

19. The method of claim 17, wherein the relational database is a medical record database, the unique identifiers being patient identifiers, and wherein the attributes are patient events, preferably selected from categories including one or more of: medical events, clinical events, therapeutic events, product prescribed, medical condition diagnosed and test result.

20. The method of claim 1, wherein the relational database comprises data indicative of a plurality of unique identifiers and data indicative of attributes associated with the unique identifiers, preferably wherein the attributes are events.

21. A computer program product comprising non-transitory computer readable instructions executable to perform a method comprising:
providing a data stack corresponding to a first subquery that forms part of the main query, wherein the main query comprises a main logical test, and the first and each further subquery that forms part of the main query comprises one or more logical sub tests, wherein the data stack acts as a container for events having codes passing the first subquery,
displaying, on a user interface, actions corresponding to the first data stack, the actions further comprising specifying logical sub tests used to fill the first data stack,
adding a first dataset obtained from a relational database to the first data stack,
providing a first real result table containing the first dataset obtained from the relational database using the first data stack, the first dataset answering the first subquery that forms part of the main query,
providing one or more further data stacks corresponding to one or more further subqueries that form part of the main query, wherein each of the one or more data stacks acts as a container for events having codes passing the one or more further subqueries,
displaying, on a user interface, actions corresponding to the one or more further data stacks, the actions further comprising specifying logical sub tests used to fill the one or more further data stacks,
adding a respective further dataset obtained from the database to each of the one or more further data stacks,
providing one or more further real result tables, each of the one or more further real result tables containing a respective further dataset obtained from the database, each of the one or more further datasets answering a respective further subquery that forms part of the main query,
and obtaining a dataset from the first real result table and the one or more further real result tables answering the main query, wherein the dataset is displayed on the user interface.

22. A non-transitory computer readable medium comprising software which, when run on a set of one or more processors, implements a method comprising:
providing a data stack corresponding to a first subquery that forms part of the main query, wherein the main query comprises a main logical test, and the first and each further subquery that forms part of the main query comprises one or more logical sub tests, wherein the data stack acts as a container for events having codes passing the first subquery,
displaying, on a user interface, actions corresponding to the first data stack, the actions further comprising specifying logical sub tests used to fill the first data stack,
adding a first dataset obtained from a relational database to the first data stack,
providing a first real result table containing the first dataset obtained from the relational database using the first data stack, the first dataset answering the first subquery that forms part of the main query,
providing one or more further data stacks corresponding to one or more further subqueries that form part of the main query, wherein each of the one or more data stacks acts as a container for events having codes passing the one or more further subqueries,
displaying, on a user interface, actions corresponding to the one or more further data stacks, the actions further comprising specifying logical sub tests used to fill the one or more further data stacks,
adding a respective further dataset obtained from the database to each of the one or more further data stacks,
providing one or more further real result tables, each of the one or more further real result tables containing a respective further dataset obtained from the database, each of the one or more further datasets answering a respective further subquery that forms part of the main query,
and obtaining a dataset from the first real result table and the one or more further real result tables answering the main query, wherein the dataset is displayed on the user interface.

* * * * *

UNITED STATES PATENT AND TRADEMARK OFFICE
CERTIFICATE OF CORRECTION

PATENT NO. : 9,672,268 B2
APPLICATION NO. : 14/395318
DATED : June 6, 2017
INVENTOR(S) : Adrian Bleach It is certified that error appears in the above-identified patent and that said Letters Patent is hereby corrected as shown below:

On the Title Page

Item (71), Column 1, in "Applicant", Line 1, after "Brighton" delete ",".

Item (72), Column 1, in "Inventor", Line 1, after "Brighton" insert -- Sussex --.

Item (73), Column 1, in "Assignee", Line 2, after "Brighton" delete ",".

Item (56), Column 2, under "U.S. Patent Documents", Line 1, after "30321" insert -- 1/1 --.

Item (56), Column 2, under "U.S. Patent Documents", Line 2, after "12132" insert -- 1/1 --.

In the Specification

In Column 1, Line 9, delete "Database"filed" and insert -- Database" filed --, therefor.

In Column 6, Line 1, delete "the a" and insert -- the --, therefor.

In Column 16, Line 63, delete "DSCRIPTION" and insert -- DESCRIPTION --, therefor.

In Column 17, Line 13, after "invention;" insert -- and --.

In Column 17, Line 14, delete "and" before "FIG. 6".

In Column 21, Line 33, delete "B." and insert -- 2B. --, therefor.

In Column 26, Line 3, delete "clm.Memberid_FK" and insert -- clm.MemberId_FK --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*

In Columns 27-28, in "Table", Line 6, delete "clm.MemberId FK" and insert -- clm.MemberId_FK --, therefor.

In Columns 27-28, in "Table", Line 35, delete "clm.CodeListId FK" and insert -- clm.CodeListId_FK --, therefor.

In Columns 27-28, in "Table", Line 50, delete "clm.Member Id_FK" and insert -- clm.MemberId_FK --, therefor.

In the Claims

In Column 30, in Claim 2, Line 9, insert -- The -- before "method".

In Column 30, in Claim 15, Line 55, after "comprising" delete ";" and insert -- : --, therefor.

In Column 32, in Claim 22, Line 52, after "query," insert -- and --.

In Column 32, in Claim 22, Line 53, delete "and" before "obtaining".